Aug. 1, 1950          H. S. WAKE          2,517,264
MEASURING DEVICE
Filed Aug. 29, 1946          3 Sheets-Sheet 2
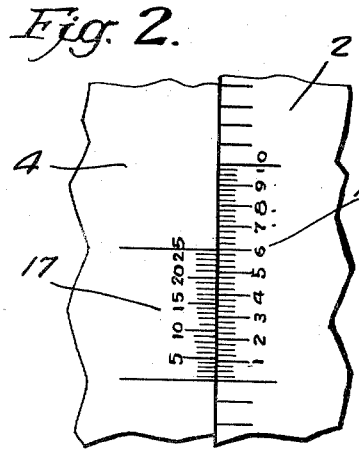
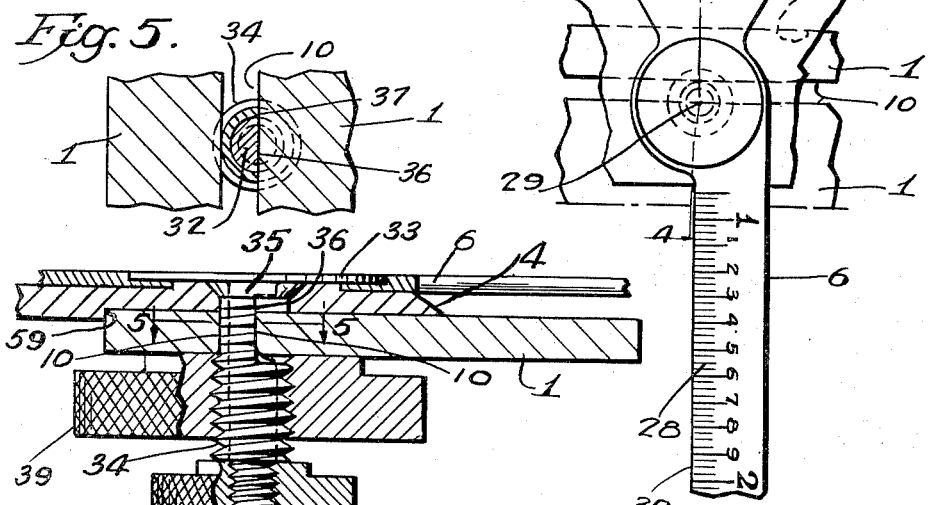
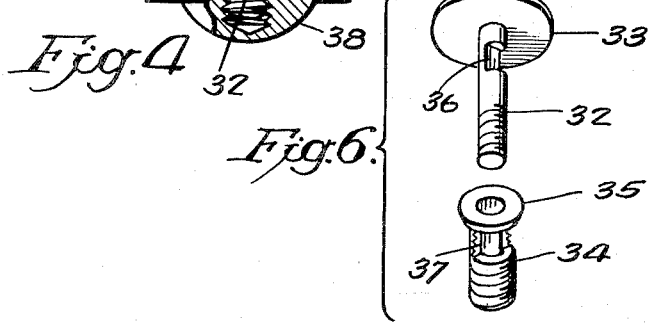
Inventor:-
Henry S. Wake
by his Attorneys
Howson + Howson

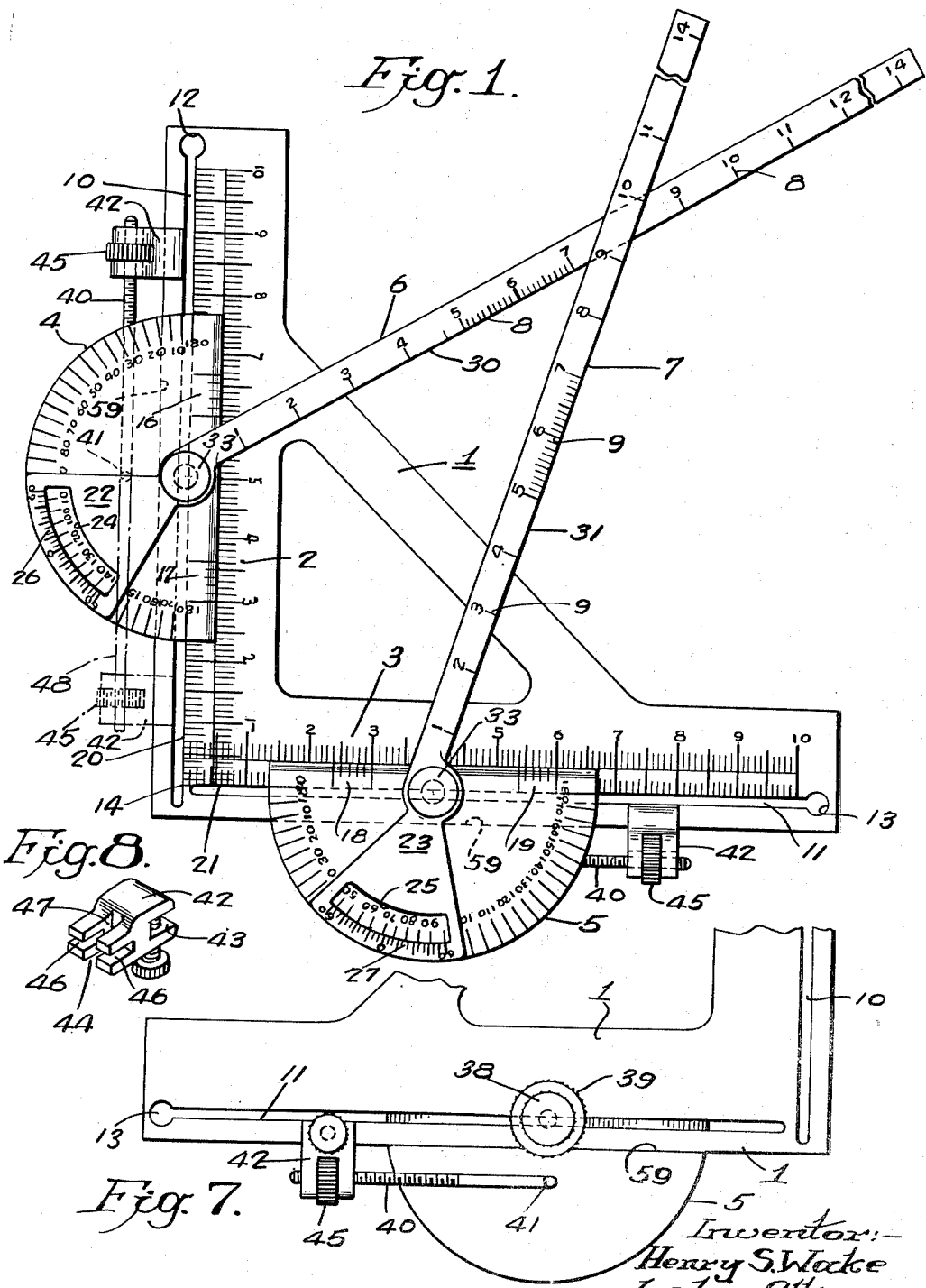

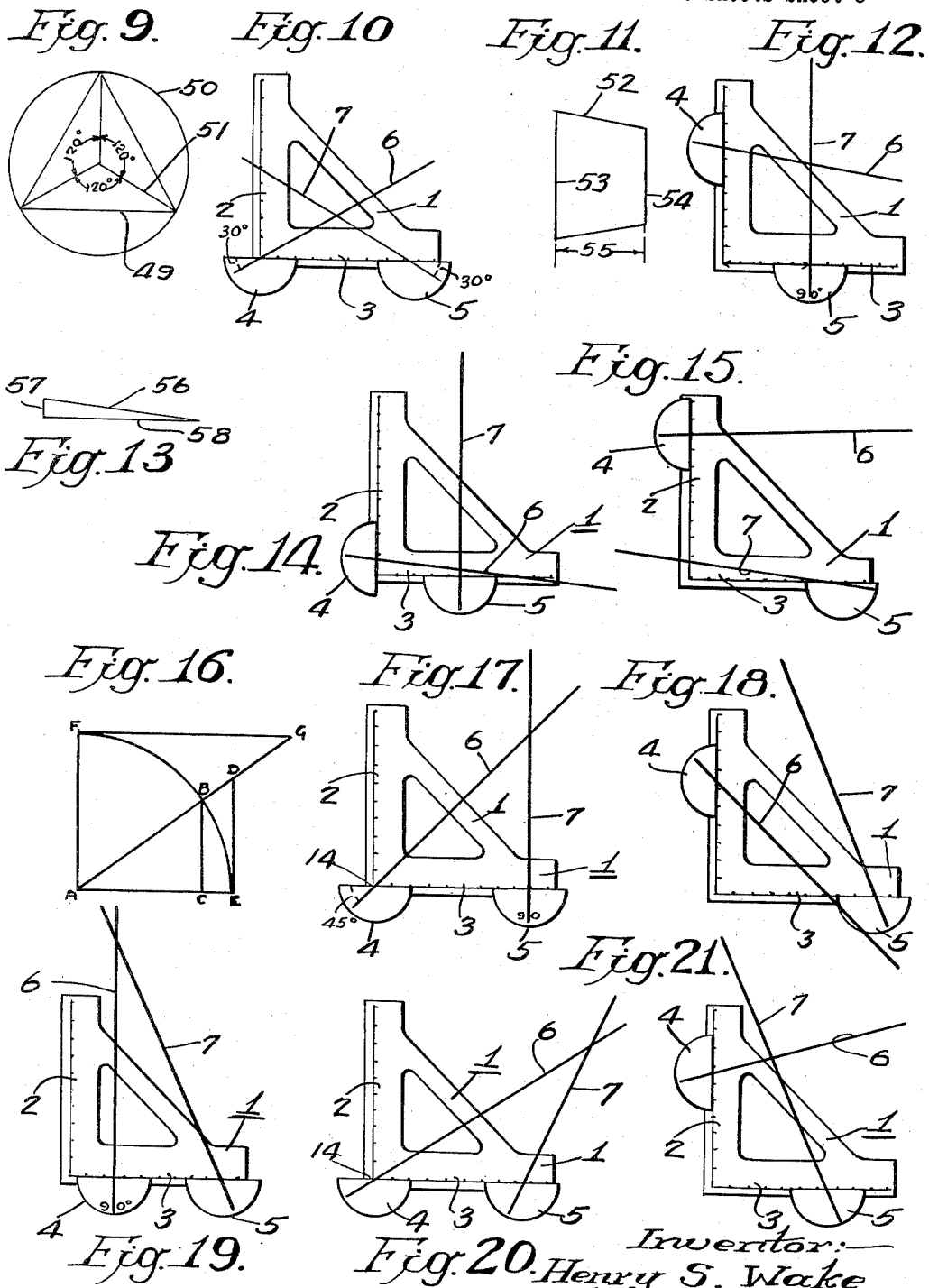

Patented Aug. 1, 1950

2,517,264

UNITED STATES PATENT OFFICE 2,517,264

MEASURING DEVICE

Henry S. Wake, Lansdowne, Pa.

Application August 29, 1946, Serial No. 693,669

6 Claims. (Cl. 33—94)

This invention relates to measuring devices for determining distances or dimensions and angles, and has for its principal object the provision of a simple and accurate instrument which may be used by persons in various fields and which is applicable to a wide variety of uses. For example, the device may be used by engineers, mechanics, surveyors, carpenters, etc. to solve problems which are regularly encountered by such persons, or it may be used by anyone who has a particular problem in respect to distances and angles.

In accordance with the present invention, there is provided a novel device comprising a member having a pair of linear scale portions fixedly disposed in right-hand relation to one another, a pair of protractors associated respectively with said scale portions and arranged for sliding movement therealong, and a pair of arms pivotally associated respectively with said protractors for setting various angles, said arms having extending linear scale portions and being individually movable so that they may be brought into association with one another or with the scale portions of said member. There are also provided vernier scales on said protractors and said arms which enable very accurate adjustment thereof.

The invention has as a further object the provision of simple and easily operable means for selectively fixing the positions of the protractors and their associated arms. In accordance with this object, there is provided a novel common fastening means for each protractor and its associated arm, such means including selectively actuable elements for selectively fixing the position of the protractor and the associated arm.

A further object of the invention is to provide means for easily and quickly effecting the vernier movements of the protractors. In accordance with this object, there is provided a novel adjuster in conjunction with each protractor, which is adapted for use regardless of the position of the protractor along the linear scale with which it is associated.

Having in mind the foregoing brief statement of objects and features, the invention may be fully understood by reference to the preferred embodiment illustrated in the accompanying drawings, wherein Fig. 1 is a face view of the device;

Fig. 2 is an enlarged fragmentary view showing one of the linear scales and its associated vernier scale;

Fig. 3 is an enlarged fragmentary view showing one of the protractor scales and the associated vernier scale;

Fig. 4 is a sectional view taken along line 4—4 of Fig. 3;

Fig. 5 is a sectional view taken along line 5—5 of Fig. 4;

Fig. 6 is a perspective view illustrating certain parts of the securing means shown in Fig. 4;

Fig. 7 is a fragmentary rear view showing more clearly the means for effecting accurate vernier movements of one of the protractors;

Fig. 8 is a perspective view of the retainer element employed as a part of said means; and Figs. 9 to 21 are simplified diagrammatic views illustrating some of the uses of the device.

Referring first to Fig. 1, the device comprises a frame member 1 having a pair of linear scale portions 2 and 3 which are fixedly disposed in right-angle relation to one another, a pair of protractors 4 and 5 associated respectively with said scale portions and arranged for sliding movement therealong, and a pair of arms 6 and 7 pivotally associated respectively with the protractors 4 and 5, said arms having linear scale graduations 8 and 9 and being movable individually so that they may be brought into association with one another or with the scale portions 2 and 3, as hereinafter described. To accommodate the slidable protractors, the frame member 1 is provided with slots 10 and 11 extending in right-angle to one another. At their outer ends, these slots are enlarged at 12 and 13, respectively, to enable assembly of the parts. The novel arrangement for securing each protractor and the associated arm to the frame member 1 will be described presently. The scale portions 2 and 3 are uniformly divided commencing at their true common point of intersection located at 14. Preferably, there are ten main divisions as illustrated. The length of the unit of division may be arbitrarily chosen according to the size of the device. It is important, however, that the same unit of division be employed on both scale portions. The divisions of the two scale portions 2 and 3 are uniformly subdivided into tenths of the division unit, as shown at 15 in Fig. 2, and the subdivisions are further divided into fourths thereof. Thus there are forty subdivisions of each main division unit of each of the linear scale portions 2 and 3.

On the protractors, there are provided vernier scales designated in Fig. 1 by reference characters 16 to 19, these vernier scales being cooperatively associated with the scale graduations of the scale portions 2 and 3. It will be noted that there are two vernier scales on each protractor located on opposite sides of the pivot point of the associated arm. This is necessary in order that one or the other of the vernier scales will be useful when the protractor is moved to either end of the associated linear scale. As shown in Fig. 2, each of the vernier scales covers a distance equal to twenty-four of the smaller subdivisions of the associated linear scale, and the vernier scale is uniformly divided into twenty-five subdivisions.

The edges 20 and 21 of the scales 2 and 3 are aligned with point 14 and coincide with the base lines of the respective protractors. Each protractor has one hundred and eighty subdivisions, as shown in Fig. 3, each subdivision representing an angular distance of one degree. The axes of rotation of the arms 6 and 7 are located on the base lines of the respective protractors, and the arms have enlarged portions 22 and 23 having windows or openings 24 and 25 and also having vernier scales 26 and 27. As shown in Fig. 3, each of the vernier scales 26 and 27 has a zero reference line and twelve subdivisions on each side thereof. The twelve vernier subdivisions occupy the same space as twenty-three subdivisions of the protractor scale. By means of the vernier, it is possible to read any angle accurately to the nearest minute.

As previously mentioned, the extending portions of arms 6 and 7 are provided with linear scale graduations 8 and 9 which have the same main unit of division as do the linear scale portions 2 and 3. As shown at 28 in Fig. 3, each unit of division is subdivided similarly to the subdivision of the scale portions 2 and 3, there being a total of forty subdivisions in each main division unit. The zero point of each arm scale coincides with the axis of rotation of the arm as indicated at 29 in Fig. 3. The scale edges 30 and 31 of the two arms are aligned respectively with the axes of rotation. The arms 6 and 7 may be of any convenient or desired length, depending on the size of the device, and there may be as many main scale divisions on the arms as the length thereof will permit.

Each protractor and its associated arm is secured to the frame member 1 by means of the mechanism shown in Figs. 4 to 6. A threaded stud 32 extends through apertures in the associated arm and protractor and through the associated slot of the frame member, and has a head 33 which seats in a recess in the outer surface of the arm. A hollow threaded stud 34 surrounds the stud 32 and extends through the protractor and through the slot in the frame member 1. The head 35 of stud 34 is countersunk in the protractor. The two studs are cut away at 36 and 37, respectively, (see Fig. 6), and the reduced portions thereof fit snugly within the slot, preventing the studs from turning with respect to the frame member 1. The inner stud 32 extends beyond the outer stud, and nuts 38 and 39 are provided on the respective studs, as clearly illustrated in Fig. 4. The outer stud 34 and its associated nut 39 serve to secure the protractor in fixed position with respect to the associated linear scale while the inner stud 32 and its associated nut 38 serve to secure the arm in fixed position. Thus, the protractor may be fixed in a desired position by tightening nut 39, while the arm is still freely rotatable, and when the arm has been adjusted as desired, it may be secured in the desired position by tightening nut 38. It will be apparent that the mechanism just described constitutes a common fastening means for the protractor and its associated arm, which means includes selectively actuable elements for securing the protractor and the arm in desired positions.

As further shown in Fig. 4, each protractor has a shoulder 59 which engages the edge of frame 1 and serves therewith to guide the protractor during sliding movement thereof.

The novel mechanism by which accurate vernier adjustment of each protractor is effected is shown in Figs. 7 and 8. A threaded rod 40 has an L-shaped end 41 which is pivotally secured to the protractor. A retainer 42 (see Fig. 8) has a screw clamp 43 adapted to engage the edge portion of frame member 1, and also has a portion 44 formed to retain a nut 45 on rod 40 and to accommodate the said rod, as shown in Fig. 7. The slots or recesses 46 (Fig. 8) are adapted to accommodate the rod 40 while the slot or recess 47 is adapted to accommodate the nut 45. With the retainer 42 secured to frame 1 by means of screw clamp 43, and with the nut 39 loosened, the protractor may be accurately adjusted by turning nut 45 and observing one of the vernier scales on the protractor with respect to the associated linear scale of frame 1. The turning of nut 45 moves the rod 40 and thus moves the protractor very slowly, the rod 40 being free to move within the recesses 46 of the retainer 42. The retainer 42 may be placed on either side of the protractor and the arm 40 may be brought into cooperative relation therewith, as indicated by the dot-and-dash representation 48 in Fig. 1. It will be recalled that the rod 40 is pivotally connected to the protractor so that it is movable about its pivot point. Thus the vernier actuating mechanism may be employed even when the protractor is at either end of the associated linear scale. By means of the scale and vernier arrangement shown in Fig. 2 and the vernier adjusting mechanism, it is possible to adjust each protractor with an accuracy of one-thousandths of the main division unit of scales 2 and 3. If the main division unit represents one inch, the accuracy of adjustment is within one-thousandths of an inch.

Referring now to Figs. 9 to 20, there are illustrated some of the various uses to which the device may be put. In these illustrations, the movable arms of the device are represented by single lines for simplicity and for clarity of illustration.

Referring first to Figs. 9 and 10, suppose that it is desired to determine the length of a chord 49 which may be considered as one side of an equilateral triangle inscribed within a circle 50 whose radius 51 is known. It will be apparent that the chord 49 forms the base of an isosceles triangle whose base angles are equal to 30°. Fig. 10 illustrates the solution of this problem. The protractor 4 is moved to the lowermost point and is swung through 90° and secured in position. Referring back to Fig. 1, the inner end of slot 10 is so extended that the protractor 4 may be positioned as shown in Fig. 10, and when it is thus positioned the axis of rotation of arm 6 coincides with point 14. The arm 6 is then positioned at an angle of 30° with respect to the scale 3. The arm 7 is likewise positioned at an angle of 30° with respect to the scale 3, and the protractor 5 is moved along scale 3 until the intersecting point of arms 6 and 7 corresponds to the radius 51 of the given circle. The protractor 5 is then fixed in position and the length of chord 49 is read on the scale 3. Due to the vernier mechanism, this length may be determined very accurately.

Referring now to Figs. 11 and 12, suppose that it is desired to determine the taper of a shaft section 52, being given the two diameters 53 and 54 and the length 55. As shown in Fig. 12, the protractor 5 is set at a point corresponding to the length 55. The protractor 4 is set at any convenient point along its associated scale 2. Arm 7 is set in its 90° position. Arm 6 is moved until it intersects arm 7 at a point which is below the axis of rotation of arm 6 a distance equal to one-half the difference between the two diameters 53 and 54. The taper is then read on protractor 4.

Referring to Figs. 13 to 15, suppose it is desired to determine a relatively long taper as represented at 56 in Fig. 13. As shown in Fig. 14, the height 57 may be set on scale 2, and the arm 6 may be adjusted so that it intersects scale 3 at a distance corresponding to the length 58. The taper may then be read on protractor 4. In this instance, the protractor 5 and arm 7 are not utilized. Alternatively, as shown in Fig. 15, the length 58 may be set on scale 3 and the arm 7 may be adjusted so that it intersects scale 2 at a distance corresponding to the height 57. The taper may then be read on protractor 5.

With the aid of the diagram of Fig. 16, it may be seen that the device can be used to determine the functions of any angle. Referring to Fig. 16, an arc EF is swung about point A, and the two lines AF and AE are drawn at right angles to one another. A line AG is drawn from point A at any angle to line AE. Lines BC and DE are drawn perpendicular to line AE, and line FG is drawn perpendicular to line AF. If the radius of arc EF is taken as unity, the functions of angle EAG are as follows:

BC=sine
AC=cosine
DE=tangent
FG=cotangent
AD=secant
AG=cosecant

Suppose, for example, it is desired to find the tangent of a certain angle. The device will then be set according to the triangle ADE of Fig. 16, as shown in Fig. 17. With the portractor 4 set as illustrated, the protractor 5 is set at an arbitrary distance which is taken as unity. Arm 7 is set in the 90° position, and arm 6 is set at the given angle. The tangent of the angle is then read on arm 7 in terms of the dimension taken as unity along scale 3. In like manner, the various other functions of the given angle may be determined by appropriate setting of the device.

Figs. 18 to 21 illustrate the determination of various parts of geometric figures. In the case of a right triangle, the angles and sides of the triangle may be completely determined if one is given an acute angle and one side, or an acute angle and the hypotenuse, or the three sides. This may be done, as shown in Fig. 18, by using the two scales 2 and 3 and one of the arms, e. g. arm 6, or it may be done as shown in Fig. 19 by using one of the fixed scales, e. g. scale 3, and both of the arms 6 and 7. Therefore, it is possible to determine the sides and angles of a right triangle no matter what its shape may be.

In the case of an oblique triangle, as shown in Fig. 20, it is possible to completely determine the sides and angles if one is given the three sides, or two sides and the included angle, or two angles and the included side. This is done by using one of the fixed scales, e. g. scale 3, and the two arms 6 and 7.

In the case of a quadrilateral having at least one right angle, as shown in Fig. 21, it is possible to determine the sides and angles if one is given two sides and two oblique angles, or three sides and one oblique angle, or the four sides. This is done by using both of the fixed scales 2 and 3 and both of the arms 6 and 7.

It will be seen from the foregoing description that the device is capable of a wide variety of uses. Many uses other than those specifically mentioned above will be apparent to persons using the device. With a little practice, a person can become very proficient in using the device and can accurately determine many things very quickly which normally require reference to tables and considerably calculation.

While a preferred form of the device has been illustrated and described, it will be apparent that the invention is not limited thereto but is capable of various modifications as will be apparent to those skilled in the art.

I claim:

1. A device of the class described, comprising a member having a pair of linear scale portions fixedly disposed in right angle relation to one another, said member having a pair of slots disposed respectively adjacent said scale portions, one of said slots being extended at the end thereof in closer proximity to the other slot, a pair of protractors associated respectively with said scale portions and including attachment means slidable in the respective slots, and an arm pivotally associated with each protractor for setting various angles, said arms extending from the protractors and having linear scale graduations thereon, and being individually movable so that they may be brought into association with one another or with the scale portions of said member, the aforementioned extension of one slot enabling the positioning of the associated protractor so that the axis of rotation of its arm coincides with the point of intersection of said scale portions.

2. A device of the class described, comprising a member having a pair of linear scale portions fixedly disposed in right angle relation to one another, said member having a pair of slots disposed respectively adjacent said scale portions, one of said slots being extended at the end thereof in closer proximity to the other slot, a pair of protractors associated respectively with said scale portions and including attachment means slidable in the respective slots, said protractors having vernier scales thereon cooperating with said scale portions, and an arm pivotally associated with each protractor for setting various angles, said arms having vernier scales thereon cooperating with the protractor scales, said arms extending from the protractors and having linear scale graduations thereon, and being individually movable so that they may be brought into association with one another or with the scale portions of said member, the aforementioned extension of one slot enabling the positioning of the associated protractor so that the axis of rotation of its arm coincides with the point of intersection of said scale portions.

3. A device of the class described, comprising a member having a pair of linear scale portions fixedly disposed in right angle relation to one another, said member having a pair of slots disposed respectively adjacent said scale portions, one of said slots being extended at the end thereof in closer proximity to the other slot, a pair of protractors associated respectively with said scale portions and including attachment means slidable in the respective slots, said protractors having vernier scales thereon cooperating with said scale portions, and an arm pivotally associated with each protractor for setting various angles, said arms having vernier scales thereon cooperating with the protractor scales, said arms extending from the protractors and having linear scale graduations thereon, and being individually movable so that they may be brought into association with one another or with the scale portions of said member, the aforementioned extension of one slot enabling the positioning of the associated protractor so that the axis of rotation of its arm coincides with the point of intersection of said scale portions, and means associated with each protractor for effecting vernier movements thereof.

4. A device according to claim 3, wherein said last-recited means includes a threaded rod pivotally secured to the protractor, a nut engaging said rod, and a retainer for the nut adjustably secured to the associated portion of said member.

5. A device of the class described, comprising a member having a pair of linear scale portions fixedly disposed in right angle relation to one another, and having a pair of slots similarly disposed, a pair of protractors associated respectively with said scale portions and including attachment means slidable in the respective slots, said protractors having vernier scales thereon cooperating with said scale portions, an arm pivotally associated with each protractor for setting various angles, said arms having vernier scales thereon cooperating with the protractor scales, said arms extending from the protractors and having linear graduations thereon, and being individually movable so that they may be brought into association with one another or with the scale portions of said member, a threaded rod pivotally secured to each protractor, a nut engaging each rod, and a retainer for each nut removably and adjustably secured to said member adjacent the associated protractor, rotation of each nut effecting vernier movements of the associated protractor from either side thereof depending upon the disposition of the retainer and the threaded rod.

6. A device according to claim 5, wherein each protractor has a pair of vernier scales disposed respectively on each side of the pivot point of the associated arm.

HENRY S. WAKE.

REFERENCES CITED

The following references are of record in the file of this patent:

UNITED STATES PATENTS

| Number | Name | Date |
|---|---|---|
| 366,404 | Klif | July 12, 1887 |
| 375,049 | Coughlin | Dec. 20, 1887 |
| 602,524 | Rockey et al. | Apr. 19, 1898 |
| 982,793 | Burrage | Jan. 31, 1911 |
| 1,024,863 | Myers | Apr. 30, 1912 |
| 1,442,710 | Webster | Jan. 16, 1923 |
| 1,661,095 | Rowe | Feb. 28, 1928 |
| 1,797,827 | Heimrich | Mar. 24, 1931 |

FOREIGN PATENTS

| Number | Country | Date |
|---|---|---|
| 99,842 | Germany | Nov. 1, 1898 |